(12) United States Patent
Chao et al.

(10) Patent No.: US 9,906,921 B2
(45) Date of Patent: *Feb. 27, 2018

(54) UPDATING POINTS OF INTEREST FOR POSITIONING

(71) Applicant: QUALCOMM Incorporated, San Diego, CA (US)

(72) Inventors: Hui Chao, San Jose, CA (US); Jiajian Chen, San Jose, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/618,357

(22) Filed: Feb. 10, 2015

(65) Prior Publication Data

US 2016/0234652 A1    Aug. 11, 2016

(51) Int. Cl.
*H04W 4/04* (2009.01)
*H04W 4/02* (2018.01)

(52) U.S. Cl.
CPC ........... *H04W 4/043* (2013.01); *H04W 4/025* (2013.01)

(58) Field of Classification Search
CPC ........... G06F 17/3087; G06F 17/30241; G06F 17/30867; G06F 3/0481; G06Q 50/01; G06Q 10/00; H04W 4/025; H04W 4/04
See application file for complete search history.

(56) References Cited

U.S. PATENT DOCUMENTS

| | | |
|---|---|---|
| 7,751,949 B2 | 7/2010 | Alanen et al. |
| 8,624,725 B1 | 1/2014 | MacGregor |
| 8,930,135 B2 * | 1/2015 | Abramovich Ettinger ............ G01C 21/3476 340/995.19 |
| 9,069,794 B1 * | 6/2015 | Bandukwala ..... G06F 17/30256 |
| 2003/0167120 A1 * | 9/2003 | Kawasaki .......... G01C 21/3682 701/426 |
| 2009/0312871 A1 * | 12/2009 | Lee ........................ G01C 21/00 700/259 |
| 2012/0130762 A1 | 5/2012 | Gale et al. |
| 2012/0131028 A1 * | 5/2012 | Glachant ........... G06F 17/30241 707/758 |
| 2012/0166074 A1 | 6/2012 | Weng et al. |
| 2013/0212094 A1 | 8/2013 | Naguib et al. |
| 2013/0262479 A1 | 10/2013 | Liang et al. |
| 2013/0322767 A1 * | 12/2013 | Chao ..................... G06K 9/4604 382/199 |
| 2013/0344888 A1 * | 12/2013 | Dousse ................. H04W 4/025 455/456.1 |
| 2014/0114567 A1 | 4/2014 | Buchanan et al. |
| 2014/0301645 A1 * | 10/2014 | Mattila ............... G06K 9/00476 382/182 |
| 2015/0012501 A1 * | 1/2015 | Xing ................. G06F 17/30303 707/690 |
| 2015/0116360 A1 * | 4/2015 | Jones ...................... G06T 11/60 345/634 |
| 2015/0169977 A1 * | 6/2015 | Corpet ..................... G06K 9/46 382/201 |

* cited by examiner

*Primary Examiner* — Kwasi Karikari

(74) *Attorney, Agent, or Firm* — Berkeley Law & Technology Group, LLP

(57) ABSTRACT

Example methods, apparatuses, or articles of manufacture are disclosed herein that may be utilized, in whole or in part, to facilitate or support one or more operations or techniques for updating points of interest (POIs), such as for use in or with a mobile communication device, for example.

20 Claims, 6 Drawing Sheets

UPDATING POINTS OF INTEREST FOR POSITIONING

BACKGROUND

1. Field

The present disclosure relates generally to position or location estimations of mobile communication devices and, more particularly, to updating points of interest (POIs).

2. Information

Mobile communication devices, such as, for example, cellular telephones, portable navigation units, laptop computers, personal digital assistants, or the like are becoming more common every day. Certain mobile communication devices, such as, for example, location-aware cellular telephones, smart telephones, or the like may assist users in estimating their geographic locations by providing positioning assistance data obtained or gathered from various systems. For example, in an outdoor environment, certain mobile communication devices may obtain an estimate of their geographic location or so-called "position fix" by acquiring wireless signals from a satellite positioning system (SPS), such as the global positioning system (GPS) or other like Global Navigation Satellite Systems (GNSS), cellular base station, etc. via a cellular telephone or other wireless communications network. Acquired wireless signals may, for example, be processed by or at a mobile communication device, and its location may be estimated using known techniques, such as Advanced Forward Link Trilateration (AFLT), base station identification, or the like.

In an indoor environment, mobile communication devices may be unable to reliably receive or acquire satellite or like wireless signals to facilitate or support one or more position estimation techniques. For example, signals from an SPS or other wireless transmitters may be attenuated or otherwise affected in some manner (e.g., insufficient, weak, fragmentary, etc.), which may at least partially preclude their use for position estimations. As such, in an indoor environment, different techniques may be employed to enable navigation or location services. For example, a mobile communication device may obtain a position fix by measuring ranges to three or more terrestrial wireless access points positioned at known locations. Ranges may be measured, for example, by obtaining a Media Access Control identifier (MAC ID) address from wireless signals received from suitable access points and measuring one or more characteristics of received signals, such as signal strength, round trip delay, or the like. A position of a mobile communication device, such as in an indoor environment, for example, may also be estimated via heat map or radio map signature matching. For example, current or live characteristics of wireless signals received at a mobile communication device may be compared with expected or previously measured signal characteristics stored as heat map values in a database. By finding a signature in a database that more closely matches characteristics exhibited by signals currently received at a mobile communication device, a location associated with a matching signature may be used as an estimated location of the device.

At times, an indoor location of a mobile communication device may be estimated via a visual landmark-type positioning in which one or more visual features of a landmark, such as a logo of a particular store, for example, may be recognized in a digital image captured by an associated imaging device, such as a built-in camera. Typically, in visual landmark-type positioning, locations of visual landmarks (e.g., stores, etc.) may, for example, be known a priori such that recognition of a particular visible landmark in an image obtained at an imaging device may suggest that the imaging device is in visual proximity of, or located in some relation to, the visible landmark. For example, in a shopping mall or like venue, for a given storefront that is currently observed by a built-in camera, a location of an associated mobile communication device may be inversely estimated based, at least in part, on a floor area from which the storefront is visible and/or in a line of sight. In some instances, however, visible landmarks within a venue may change over time, such as if a particular business or store moves out or relocates, for example, which may affect positioning accuracy of mobile communication devices.

BRIEF DESCRIPTION OF THE DRAWINGS

Non-limiting and non-exhaustive aspects are described with reference to the following figures, wherein like reference numerals refer to like parts throughout the various figures unless otherwise specified.

SUMMARY

Figure 1:
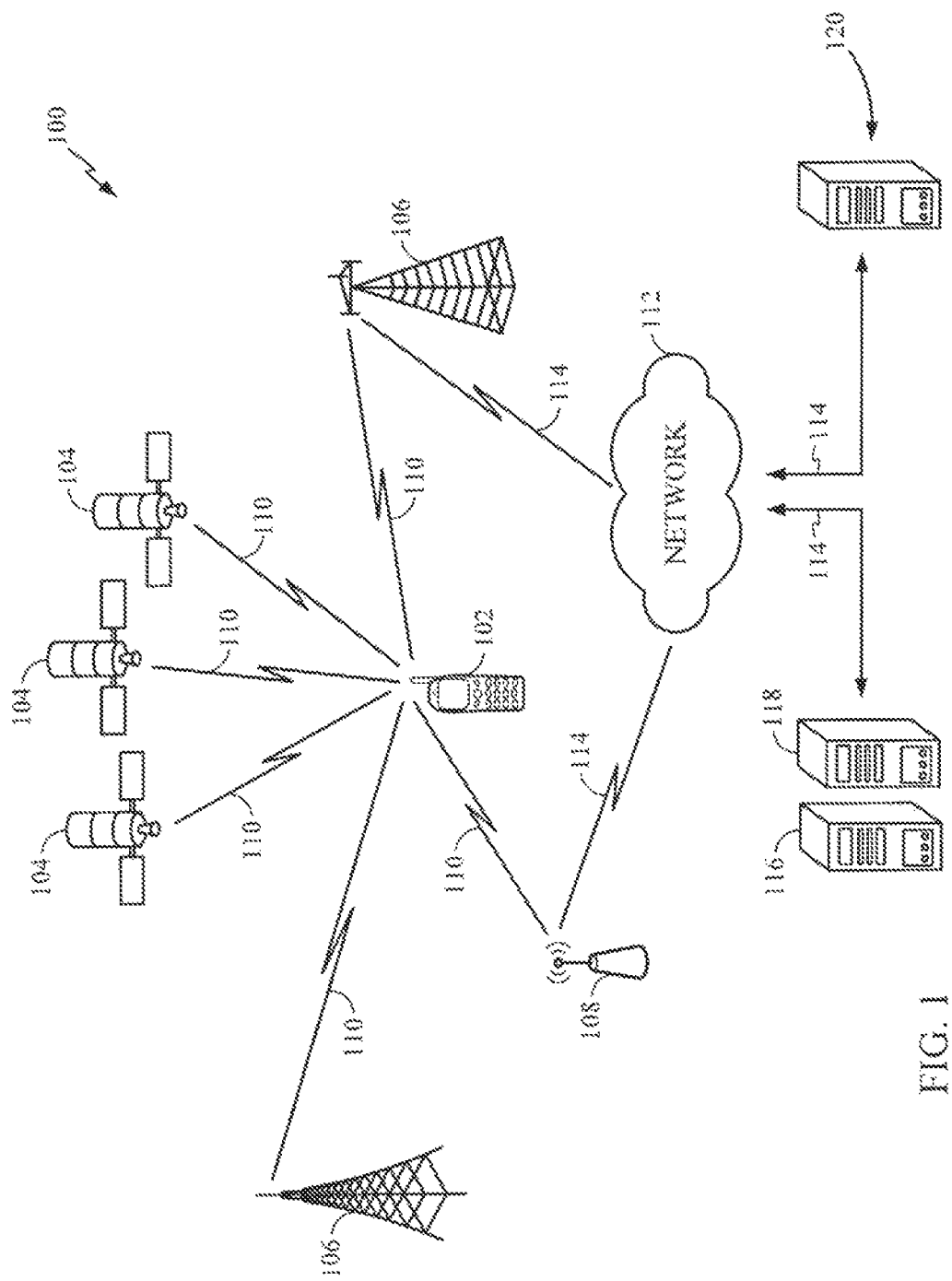
FIG. 1 is a schematic diagram illustrating features associated with an implementation of an example operating environment.

Example implementations relate to techniques for updating points of interest (POIs). In one implementation, a method may comprise receiving messages transmitted by mobile devices, the messages comprising digital media captured at the mobile devices while the mobile devices are located in a venue; determining a number of matches for one or more points of interest (POIs) at the venue based, at least in part, on the digital media and visual attributes of one or more images associated with the one or more POIs; and determining a presence or an absence of the one or more POIs at the venue based, at least in part, on the number of matches over a period of time.

In another implementation, an apparatus may comprise means for receiving messages transmitted by mobile devices, the messages comprising digital media captured at the mobile devices while the mobile devices are located in a venue; means for determining a number of matches for one or more points of interest (POIs) at the venue based, at least in part, on the digital media and visual attributes of one or more images associated with the one or more POIs; and means for determining a presence or an absence of the one or more POIs at the venue based, at least in part, on the number of matches over a period of time.

In yet another implementation, an apparatus may comprise a wireless transceiver to receive messages transmitted by mobile devices, the messages comprising digital images of objects captured at the mobile devices while the mobile devices are located in a venue; and at least one processer coupled to a memory and to the wireless transceiver to associate the digital images with visual attributes of one or more images to find one or more matches of the digital images with the one or more images; and determine a presence or an absence of one or more points of interest (POIs) at the venue based, at least in part, on a frequency of digital media matching attributes of the one or more images. It should be understood, however, that these are merely example implementations, and that claimed subject matter is not limited to these particular implementations.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Some example methods, apparatuses, or articles of manufacture are disclosed herein that may be implemented, in whole or in part, to facilitate or support one or more operations and/or techniques for updating points of interest (POIs) that may, for example, be used, at least in part, in or with a mobile communication device. As used herein, "mobile device," "mobile communication device," "crowd-sourcing device," "location-aware mobile device," or like terms may be used interchangeably and refers to any kind of special purpose computing platform or apparatus that may from time to time have a position or location that changes. In some instances, a mobile communication device may, for example, be capable of communicating with other devices, mobile or otherwise, through wireless transmission or receipt of information according to one or more communication protocols. As a way of illustration, special purpose mobile communication devices, which may herein be called simply mobile devices, may include, for example, cellular telephones, smart telephones, personal digital assistants (PDAs), laptop computers, personal entertainment systems, tablet personal computers (PC), personal audio or video devices, personal navigation devices, radio heatmap generation tools, or the like. It should be appreciated, however, that these are merely examples of mobile devices that may be used, at least in part, to implement one or more operations and/or techniques for updating POIs, and that claimed subject matter is not limited in this regard. It should also be noted that the terms "position" and "location" may be used interchangeably herein.

As alluded to previously, in some instances, such as, for example, in indoor or like areas, relatively dense environments (e.g., shopping malls, factory outlets, etc.), etc., certain mobile devices may be unable to reliably receive or acquire requisite wireless signals so as to facilitate or support accurate or otherwise sufficient positioning. For example, wireless signals may be attenuated or otherwise affected in some manner (e.g., insufficient, weak, fragmentary, blocked, etc.), which may preclude their use in a given position estimation technique. Radio heatmap-type positioning, if available, may be useful, but signal-related data may be quite voluminous or comprehensive so as to tax available bandwidth in wireless communication links, memory space, battery life, etc. of a mobile device. As such, at times, positioning capabilities of certain mobile devices may be less useful or possibly faulty. Thus, as was indicated, in some instances, one or more landmark-type positioning techniques, such as via estimating user's location based, at least in part, on a visible region of a proximate landmark in an image currently obtained at an imaging device (e.g., a camera phone, etc.) may, for example, be employed, in whole or in part. As such, at times, in addition to a location-aware capability allowing a mobile device to estimate its geographic location using applicable position estimation techniques (e.g., trilateration, radio map signature matching, etc.), a mobile device may, for example, feature a video image capturing capability that may be used, at least in part, for localization. For example, as discussed below, a mobile device may comprise a camera sensor capable of capturing a suitable digital image, such as a storefront logo, etc. that may be used, at least in part, to estimate a location of the mobile device by combining image matching results with one or more landmark visibility areas (e.g., a particular hallway, floor, etc. from which the storefront logo is visible, etc.) obtained from a topological layout (e.g., a map, etc.) of an associated venue. It should be noted that the terms "landmark" and "POI" may be used interchangeably herein.

As used herein, "logo," "visual signature," "brand-specific visual signature," "brand image," "image," or like terms may be used interchangeably and refer to one or more visual elements, features, and/or attributes, brand-related or otherwise, capable of being identified or recognized based, at least in part, on their relatively uniform representation or consistency of use, in commerce or otherwise. In some instances, a logo may be associated with a good or service being provided at one or more POIs, such as stores, coffee shops, retailer outlets, banks, or the like so as to distinguish such a good or service from other goods or services, for example, or indicate a source of such a good or service. At times, a logo may be associated with a suitable infrastructure, such as an urban planning or transportation-related infrastructure, for example, provided at one or more points of interest, such as a street corner, intersection, building, or the like. A logo may also be representative of a characteristic of a suitable infrastructure, such as, for example, a particular portion of a building exterior (e.g., façade, side, back, etc.), just to illustrate another possible implementation. Thus, in the context of the present specification, "logo" is to be interpreted broadly and may comprise any visual element, feature, and/or attribute that may be identified, such as electronically (e.g., via digital media, etc.) via one or more computer vision or like approaches, for example, that may facilitate or support one or more positioning operations in an indoor or like environment.

As a way of illustration, a logo may comprise, for example, a trademark, trade name, trade dress of a building (e.g., façade, storefront, etc.), signage (e.g., traffic sign, street designation, regulatory pictograph, etc.), logotype or wordmark, symbol, icon, emblem, badge, statute, water feature (e.g., a fountain, pool, pond, cascade, waterfalls, etc.), or the like. In some instances, a logo may, for example, be identified or recognized based, at least in part, on its uniformity or consistency of use with respect to its shape, color, size, text, text size, placement or arrangement of visual elements, features, and/or attributes, or the like. Thus, a logo may comprise the Chihuly flowers on the ceiling of the front lobby of the Bellagio® hotel, just to illustrate one possible example. As such, by crowdsourcing images of this logo, such as discussed in greater detail below, a presence or absence of one or more POIs (e.g., the front lobby, etc.) at this particular hotel may, for example, be determined. At times, a logo may comprise, for example, a dynamic logo, meaning that content or context of such a logo may change depending on a particular setting, time of day, season, location, lighting conditions, good, service, or the like. By way of example but not limitation, in some instances, visual signatures, such as Gap®, GapOutlet®, GapKids®, baby-Gap®, GapMaternity®, or the like may be representative of a dynamic logo. It should be appreciated that variations of a dynamic logo may or may not be considered different logos, which may depend, at least in part, on an application, environment, visual feature extraction techniques, logo detection approaches, or the like. Of course, these are merely examples relating to a logo, and claimed subject matter is not so limited.

As used herein, "venue" refers to a physical place or locale that may be associated with the whereabouts of an object or thing (e.g., a store, user, mobile device, etc.), such as according to a suitable point of reference. A point of reference may, for example, be represented via geographic coordinates (e.g., latitude, longitude, etc.), a street address, governmental jurisdiction, postal zip code, name, number, or the like. Optionally or alternatively, a venue may also include references to altitude, time, direction, distance (e.g., from another point of reference, etc.), or the like. In some instances, a venue may comprise, for example, a partially or substantially enclosed area, such as associated with an indoor or like environment (e.g., a building, area within a building, urban canyon, etc.), outdoor environment, or any combination thereof. By way of example but not limitation, a venue may include, for example, an office building, a convention center, an auditorium, an amphitheater, a warehouse, a classroom building, a theater, a supermarket, a shopping mall, a sports arena, a stadium, a transit station terminal, a library, a garage, or the like. Of course, these are merely examples related to a venue, and claimed subject matter is not so limited.

Thus, in some instances, such as in visual landmark-type positioning, for example, a set of suitable logos, such as reference logos stored in a database and indicative of one or more known visible landmarks, such as POIs mapped to a floor plan of a particular venue, for example, may be matched against visual features of one or more images of storefront logos concurrently captured or shown in a camera view of a mobile device. For example, here, an orientation of a mobile device may be determined, such as via one or more associated sensors (e.g., an accelerometer, gyroscope, camera sensor, etc.), and a pose with respect to one or more shown POIs may be estimated using any appropriate technique. In some instances, a pose may, for example, be estimated based, at least in part, on a line of sight angle relative to one or more shown POIs and matching one or more logos of interest with reference logos. Pose estimation is generally known and need not be described here in greater detail.

Based, at least in part, on an estimated pose and/or locations of one or more known POIs, such as one or more POIs mapped to a floor plan of a particular venue and/or associated with matched visual features or attributes of a captured digital image, for example, an estimated location of a mobile device may be computed, such as using one or more appropriate techniques. For example, here, trilateration of fields of view (e.g., in a camera view of a mobile device, etc.) of multiple visible POIs, map alignment or mapping techniques accounting for a topology (e.g., structural elements, area constraints, etc.) of a particular venue, potential position of a user relative to a logo and/or its size (e.g., actual, original, projected, etc.) in relation to one or more landmark visibility areas, etc. may be used, in whole or in part. Again, these or like techniques or approaches are generally known and need not be described here in greater detail. It should be noted that, at times, an intersection of visibility areas observable from multiple landmark locations, if available, may, for example, provide more accurate position estimation. Thus, in some instances, to facilitate or support visual landmark-type positioning, a mobile device in a venue may receive visual assistance or POI data including, for example, locations and/or visual features or attributes of known POIs in a venue, a topological layout or map of a venue, specific areas/floor plans of a venue or any portion thereof, etc. to enable the mobile device to estimate its location, such as using one or more techniques discussed herein.

At times, to facilitate or support more accurate, reliable, or otherwise suitable landmark-type positioning in a venue of interest, it may be useful to have a relatively comprehensive or otherwise sufficient knowledge of associated POIs. As was indicated, in the normal course of venue operation, POIs may change over time. For example, in a shopping mall, particular businesses or stores may transition out of the mall or a portion thereof (e.g., move out, relocate, go out of business, etc.) and, possibly, be replaced by different businesses or stores, such as transitioning into the shopping mall. With existing POIs exiting a venue and new POIs entering the venue, certain visual assistance or POI data that may be useful for landmark-type positioning, such as identities, locations, visual features or attributes, etc. of known visible POIs may, for example, become outdated and/or unreliable. As such, captured dependency between visual features or attributes of known POIs and their locations may be reduced or nullified, and, as a result, indoor localization accuracy of mobile devices may suffer. Accordingly, it may be desirable to develop one or more methods, systems, and/or apparatuses that may facilitate or support more accurate, reliable, or otherwise sufficient indoor positioning, including landmark-type positioning, for example, such as by timely updating identities, locations, visual features or attributes, etc. of one or more POIs in a more effective or efficient manner.

Thus, as will be described in greater detail below, in an implementation, one or more digital images of visual landmarks (e.g., POIs, etc.) located in or visible from a particular venue may be captured, such as via digital media, for example, and subsequently transmitted to a suitable server. As used herein, "digital media" refers to a collection of digital signals, such as communicated and/or stored signals (e.g., physical memory states, etc.), for example, representing any content including, as examples, source code, text, image, audio, video file, or the like. It may be understood that "digital image" is intended to encompass "image," although in the particular context the term "image" may be employed for ease of discussion. Here, one or more crowdsourcing techniques or approaches may, for example, be employed, in whole or in part. In this context, "crowdsourcing" refers to a process of capturing, collecting, communicating, etc. any suitable data by one or more agents, clients, or users, such as via co-located mobile devices, for example, while traveling within an indoor or like area of interest, such as a venue. The terms "agent," "user," or "client" may be used interchangeably herein and refer to a person, device, or application that may facilitate or support one or more crowdsourcing operations or techniques. For example, crowdsourcing users of mobile devices located in a venue may execute desired tasks, such as capture and/or transmit digital images of storefronts, communicate position fixes, etc. and may be rewarded in some manner for doing so, just to illustrate one possible implementation. Crowdsourcing is generally known and need not be described here in greater detail.

In some instances, crowdsourced data comprising, for example, one or more digital images of visual landmarks, such as digital images of storefront logos may be transmitted to a suitable server, such as via one or more messages. These messages may, for example, be used, at least in part, to determine a presence or an absence of one or more POIs at a venue, such as by determining and/or confirming that these one or more POIs comprise one or more POIs expected to be located in or visible from a particular venue, just to illustrate one possible implementation. For example, a crowdsourcing server may associate transmitted images with visual features or attributes of one or more known POIs stored in a venue-specific image database and expected to be located in or visible from a venue to determine matches of the images with the POIs. Here, any suitable image-processing techniques and/or approaches may be used, at least in part. As a way of illustration, a user of a mobile device located in a venue may, for example, obtain a series of digital video frames via a panning sequence to view and/or capture one or more storefront logos. Typically, "panning" refers to moving or manipulating a device, mobile or otherwise, to reposition or re-center content within a display area, such as a viewfinder for camera sensor defining a field of view, for example. Video frames may be used, at least in part, to extract visual features from one or more captured images of logos, such as using any suitable computer vision or like visual feature extraction techniques, for example.

In some instances, extracted visual features may be compared with reference images of logos stored in a suitable database (e.g., a venue-specific image database, etc.), such as at or by a crowdsourcing server, for example, to determine if there is a match. For example, one or more candidate reference images of logos having sufficiently similar visual features as one or more captured logo images may, for example, be identified as top matches using any suitable visual feature matching techniques. At times, top matches may be identified based, at least in part, on a weighted comparison of metadata, context parameters (e.g., time of day, lighting conditions, etc.), visual features or attributes, etc. associated with applicable logo images, or the like. A best or otherwise suitable candidate image of a logo representative of a specific visual signature associated with a captured POI may, for example, be selected as a matching image, if any. These or like techniques are generally known and need not be described here in greater detail. As was indicated, visual features may be extracted and/or matched using any suitable computer vision or like visual feature extraction and/or matching techniques including, for example, Scale-Invariant Feature Transform (SIFT), Speeded-Up Robust Feature (SURF), Nearest Feature Trajectory (NFT), Optical Character Recognition (OCR), proprietary corner detection-type techniques, or the like. Claimed subject matter is not limited to a particular technique, of course.

As will also be seen, according to an implementation, a matching frequency, such as a number of matches of crowdsourced digital media (e.g., images, etc.) to one or more attributes of an image of a particular POI in a venue of interest over a time period may, for example, be observed, and a presence or absence of the POI in the venue may be determined. For example, at times, it may be determined that a particular POI is no longer present in or visible from a venue if frequency or incidence of detection of the POI by crowdsourcing users decreases over a certain period of time, such as one week, one month, or the like. This may, for example, be manifested via a decrease in frequency or a number of matches of digital media (e.g., digital images of storefront logos, etc.) matching visual features or attributes of that particular POI (e.g., expected to be located in or visible from a venue) over the same period of time (e.g., one week, one month, etc.). Accordingly, in some instances, such as if it is determined that a particular POI is no longer present in or visible from a venue, visual assistance or POI data may, for example, be updated in a suitable manner, such as by removing that POI, its name, corresponding visual features or attributes, or other suitable data from a venue-specific image database, for example.

As also discussed below, in at least one implementation, a crowdsourced digital media, such as transmitted via a message from a mobile device to a suitable server, for example, may include a location tag. Depending on an implementation, a location tag may, for example, indicate an estimated location of a mobile device at the time a digital image of a certain POI was captured, an estimated location of a POI in a venue, etc., or any combination thereof. At times, a location tag may, for example, be used, at least in part, to infer or determine that a new POI has been established in a venue (e.g., moved in, transitioned into a shopping mall, etc.) and/or that a new POI replaced an existing POI, such as a POI expected to be located in or visible from a venue. Likewise, here, based, at least in part, on such an inference or determination, a suitable database (e.g., a venue-specific image database, etc.) may be updated in some manner, such as to include, for example, any suitable data for a newly discovered POI, such as its brand name, image, location, corresponding visual features or attributes, visibility areas, or the like, if applicable.

FIG. 1 is a schematic diagram illustrating features associated with an implementation of an example operating environment 100 capable of facilitating or supporting one or more processes or operations for updating POIs. It should be appreciated that operating environment 100 is described herein as a non-limiting example that may be implemented, in whole or in part, in the context of various electronic communications networks or combination of such networks, such as public networks (e.g., the Internet, the World Wide Web), private networks (e.g., intranets), wireless local area networks (WLAN, etc.), or the like. It should also be noted that claimed subject matter is not limited to indoor implementations. For example, at times, one or more operations or techniques described herein may be performed, at least in part, in an indoor-like environment, which may include partially or substantially enclosed areas, such as urban canyons, town squares, amphitheaters, parking garages, rooftop gardens, patios, or the like. At times, one or more operations or techniques described herein may be performed, at least in part, in an outdoor environment, such as in connection with a POI located outside but visible from a venue, as was indicated.

As illustrated, operating environment 100 may comprise, for example, one or more satellites 104, base transceiver stations 106, wireless transmitters 108, etc. capable of communicating with mobile device 102 via communication links 110 in accordance with one or more communication protocols. Satellites 104 may be associated with one or more satellite positioning systems (SPS), such as, for example, the United States Global Positioning System (GPS), the Russian GLONASS system, the European Galileo system, as well as any system that may utilize satellites from a combination of satellite systems, or any satellite system developed in the future. For example, satellites 104 may be from any one of several regional navigation satellite systems (RNSS) such as the Wide Area Augmentation System (WAAS), European Geostationary Navigation Overlay Service (EGNOS), Quasi-Zenith Satellite System (QZSS), etc. Base transceiver stations 106, wireless transmitters 108, etc. may be of the same or similar type, for example, or may represent different types of devices, such as access points, radio beacons, cellular base stations, femtocells, or the like, depending on an implementation.

Although not shown, in some instances, operating environment 100 may include, for example, a larger number of wireless transmitters 108 that may be associated with an indoor or like area of interest, such as a venue. A larger number of wireless transmitters 108 may correspond to or correlate with a more comprehensive indoor or like positioning approach, such as a radio heatmap, more robust topological layout with known access points, visible POIs, etc., for example. It should be noted that one or more wireless transmitters 108 may be capable of transmitting as well as receiving wireless signals. In a particular implementation, one or more wireless transmitters 108 may be capable of communicating with mobile device 102 at a shorter range than at a range enabled by base transceiver station 106. For example, one or more wireless transmitters 108 may be positioned in an indoor or like environment, such as a venue, as was indicated. One or more wireless transmitters 108 may, for example, provide access to a wireless local area network (WLAN, e.g., IEEE std. 802.11 network, etc.) or wireless personal area network (WPAN, e.g., Bluetooth® network, etc.). In another example implementation, one or more wireless transmitters 108 may comprise, for example, a femtocell transceiver capable of facilitating or supporting communication within operating environment 100 according to a cellular communication protocol.

In some instances, one or more base transceiver stations 106, wireless transmitters 108, etc. may, for example, be operatively coupled to an electronic communications network 112 that may comprise one or more wired or wireless communications or computing networks capable of providing suitable information, such as via one or more communication links 114, 110, etc. As will be seen, provided information may include, for example, positioning or visual assistance data, such as a radio heatmap, recent position fix obtained via an SPS, locations and/or visual features or attributes of POIs in a venue, location tags, wireless signal-related measurements, or the like. The terms "positioning assistance data" and "visual assistance data" may be used interchangeably herein. At times, provided information may include, for example, locations of one or more wireless transmitters 108, an electronic digital map, or any other suitable data, location-related or otherwise, capable of facilitating or supporting one or more operations or processes associated with operating environment 100. Positioning assistance data may, for example, be provided in the form of a suitable data structure, such as an audio, video, or sound file, look-up table, mathematical formula, algorithm, metadata, etc., which may depend, at least in part, on an application, network, environment, radio heatmap, mobile device, service provider, or the like.

In an implementation, network 112 may be capable of facilitating or supporting communications between suitable computing platforms or devices, such as, for example, mobile device 102, one or more base transceiver stations 106, wireless transmitters 108, as well as one or more crowdsourcing servers associated with operating environment 100. In some instances, one or more crowdsourcing servers may include, for example, a location server 116, visual assistance or POI server 118, as well as one or more other servers, indicated generally at 120 (e.g., navigation, information, map, etc. server, etc.), capable of facilitating or supporting one or more operations or processes associated with operating environment 100. In a particular implementation, network 112 may comprise, for example, Internet Protocol (IP) infrastructure capable of facilitating a communication between mobile device 102 and crowdsourcing servers 116, 118, or 120 via wireless transmitter 108, base transceiver station 106 (e.g., via a network interface, etc.), or the like. In another implementation, network 112 may comprise cellular communication network infrastructure, such as, for example, a base station controller or master switching center (not shown) to facilitate mobile cellular communication with mobile device 102.

Location server 116 may provide an estimate of a coarse location of mobile device 102 within a venue of interest associated with operating environment 100, such as at or upon entry of the venue, for example. A coarse location may, for example, be determined based, at least in part, on a last or recent position fix obtained via an SPS, input provided by an associated user, built-in or remote sensors, or the like. For example, at times, a coarse location of mobile device 102 may be determined using a proximity to one or more reference points, such as by knowing which wireless transmitter 108, etc. mobile device 102 is using at a given time. In some instances, mobile device 102 may utilize its coarse location, in whole or in part, in subsequent messages with a suitable server, such as crowdsourcing servers 116, 118, or 120, for example, to obtain an electronic digital map or other information relevant to an area in a venue identified by a coarse location (e.g., a routing graph, etc.). Optionally or alternatively, a coarse location of mobile device 102 may, for example, be determined, at least in part, on mobile device 102 using one or more applicable techniques (e.g., dead reckoning, etc.). In some instances, such as in addition to or instead of determining a coarse location via one or more applicable approaches, for example, mobile device 102 may communicate MAC addresses of one or more known (e.g., visible, etc.) wireless transmitters 108, etc. to a suitable server, and may be provided an electronic digital map of an associated area. Mobile device 102 may, for example, estimate its location based, at least in part, on provided map and known wireless transmitters 108, etc. using one or more appropriate techniques.

In addition, at times, location server 116 may, for example, provide a location context identifier (LCI) for a particular venue. As used herein, "location context identifier" (LCI) refers to a locally defined area that is not mapped according to a global coordinate system. For example, an LCI may comprise a particular floor of a building or other indoor or like area of interest, such as a portion of a floor, wing, etc. mapped according to a local coordinate system (e.g., a floor plan of a venue, etc.), just to illustrate one possible implementation. Thus, in some instances, such as at or upon entry of a venue, for example, mobile device 102 may communicate a request to location server 116 to provide one or more LCIs covering the area or adjacent areas, if desired. Here, a request may reference or otherwise include, for example, a rough location of mobile device 102, as was indicated, such that location server 116 may associate the rough location of mobile device 102 with indoor or like areas covered by one or more LCIs, and then communicate relevant LCIs to mobile device 102. In some instances, mobile device 102 may utilize one or more received LCIs having known locations, in whole or in part, in subsequent messages with a suitable server, such as server 120, for example, to obtain navigation, map, or like information (e.g., a POI location tag, etc.) relevant to an area identified by one or more LCIs (e.g., a digital map, locations or identifies of POIs and/or wireless transmitters, radio or heat maps, routeability graphs, etc.).

Visual assistance or POI server 118 may, for example, provide visual assistance or POI data, such as a table, graph, or like data structure associating specific visual signatures with one or more visible POIs having known locations, though claimed subject matter is not so limited. For example, in some instances, visual assistance or POI data may comprise a set of logos representative of store names, brands, storefront appearances, etc. mapped to a floor plan of a particular venue so as to identify one or more relevant POIs (e.g., stores, retailers, etc.). Visual assistance or POI server 118 may, for example, provide positioning assistance data, such as locations of one or more wireless transmitters 108, a radio heatmap, or the like. For example, visual assistance or POI server 118 may provide locations of one or more POIs, wireless transmitters 108, etc. via a suitable reference frame, such as (X, Y, Z) coordinates in three-dimensional Cartesian coordinate space that may be mapped according to a global coordinate system, local coordinate system (e.g., floor plan of a venue, etc.), etc., just to illustrate a few possible implementations. As will be seen, mapped locations of POIs may, for example, be used, at least in part, in connection with matching visible attributes of the POIs over a time period to determine a presence or an absence of these POIs at a venue, infer or determine that at least one POI is no longer present in or visible from a venue, that new POI has replaced an existing POI, etc. Of course, claimed subject matter is not limited to a particular reference frame or positioning assistance data.

In some instances, server 120 may comprise a map server, for example, that may provide an electronic digital map as well as other visual assistance or POI data or like information for a particular indoor or like area of interest, such as a venue. An electronic digital map may comprise, for example, a floor plan or layout of a venue or a portion thereof. By way of non-limiting example, an electronic digital map may include one or more computer-aided design (CAD) type files identifying structural features of a venue, such as walls, rooms, doors, passageways, elevators, staircases, ladders, floors, ceilings, or the like. At times, an electronic digital map may comprise, for example, locations of one or more POIs, wireless transmitters 108, etc. relative to one or more areas within a venue, structural features (e.g., walls, doors, windows, etc.), or the like. Thus, in some instances, such as at or upon entry of a venue of interest, upon user input, etc., mobile device 102 may communicate a request to server 120 (e.g., a map server, etc.) to provide an electronic digital map covering the venue, a portion thereof, or adjacent areas, if applicable. A request may reference or otherwise include, for example, a coarse location of mobile device 102, as was indicated, such that server 120 (e.g., a map server, etc.) may associate the coarse location of mobile device 102 with a particular area in a venue, and then communicate a relevant map to mobile device 102.

At times, a user's location may, for example, be estimated using a communicated electronic digital map covering one or more landmarks (e.g., storefronts, POIs, etc.) identified in connection with one or more relevant visibility areas, such as areas from which these particular landmarks may be visible to a user (e.g., hallway regions in the line of sight of the POIs, etc.). As one or more landmarks are captured, a location of a user (and associated mobile device) may, for example, be estimated as a function of overlapping visibility regions. In some instances, a position fix may, for example, be derived or approximated from the center of mass of applicable overlapping regions. At times, a position fix may, for example, be improved or refined by taking into account the likelihood of where a user may stand and may be based, at least in part, on a particularities of an area, pose estimation, associated confidence (e.g., computed via an appropriate computer vision algorithm, etc.), and/or a best viewing angle and distance from which a landmark may be seen or captured. An electronic digital map may also be used, at least in part, to provide additional context to a crowdsourcing user capturing collecting, communicating, etc. digital images of storefronts, position fixes, etc., such as while traveling within a venue.

According to an embodiment, mobile device 102 may access or obtain suitable visual assistance or POI data via communications with crowdsourcing servers 116, 118, or 120 by, for example, requesting the data through selection of a universal resource locator (URL), as previously mentioned. In particular implementations, crowdsourcing servers 116, 118, or 120 may be capable of providing positioning assistance data to cover many different indoor areas in a venue including, for example, floors of buildings, wings of hospitals, terminals at an airport, portions of a university campus, areas of a large shopping mall, just to name a few examples. At times, memory resources at mobile device 102 and data transmission resources may make receipt of positioning assistance data for all areas served by crowdsourcing servers 116, 118, or 120 impractical or infeasible; thus, a request for positioning assistance data from mobile device 102 may indicate a course estimate of a location of mobile device 102, as was indicated. Mobile device 102 may then be provided positioning assistance data covering areas proximate to a course estimate of a location of mobile device 102. Optionally or alternatively, MAC addresses of one or more known (e.g., visible, etc.) wireless transmitters 108, etc. may, for example, be communicated by mobile device 102 to a suitable server, such as for current location determination, as was also discussed.

In particular implementations and as discussed herein, mobile device 102 may have circuitry and processing resources capable of capturing, measuring, collecting, storing, or communicating suitable data, such as locations and/or visual features or attributes of POIs, signal-related characteristics (e.g., RSSI, RTT, etc.), estimating fixed transmitter locations, computing a position fix, or the like. For example, mobile device 102 may compute a position fix based, at least in part, on pseudorange measurements to four or more SPS satellites 104. Here, mobile device 102 may compute such pseudorange measurements based, at least in part, on pseudonoise code phase detections in signals 110 acquired from four or more SPS satellites 104, for example. In particular implementations, mobile device 102 may receive from crowdsourcing servers 116, 118, or 120 positioning assistance data to aid in the acquisition of signals transmitted by SPS satellites 104 including, for example, almanac, ephemeris data, Doppler search windows, just to name a few examples.

In other implementations, mobile device 102 may, for example, obtain a position fix by processing signals received from one or more terrestrial wireless transmitters positioned at known fixed locations (e.g., wireless transmitter 108, base transceiver station 106, etc.) using any one of several techniques such as, for example, advanced forward trilateration (AFLT), observed time difference of arrival (OT-DOA), or the like. In these particular techniques, a range from mobile device 102 may be measured to three or more of such transmitters based, at least in part, on pilot signals transmitted by the transmitters and received at mobile device 102. In some instances, locations or identities (e.g., a MAC address, etc.) of one or more base transceiver stations 106, wireless transmitters 108, etc. in a particular area associated with operating environment 100 may be provided by crowdsourcing servers 116, 118, or 120 in the form of a base station almanac (BSA).

As was indicated, in some instances, mobile device 102 may be capable of computing a position fix based, at least in part, on signals acquired from one or more terrestrial wireless transmitters 108 (e.g., WLAN access points positioned at known locations, etc.). For example, mobile device 102 may obtain a position fix by measuring ranges to three or more suitable indoor terrestrial wireless access points positioned at known locations. Ranges may be measured, for example, by obtaining a MAC ID address from signals received from access points and obtaining range measurements to these access points by measuring one or more received signal characteristics (e.g., RSSI, RTT, etc.). In at least one implementation, mobile device 102 may obtain a position fix by measuring or applying characteristics of acquired signals to a radio heatmap indicating expected RSSI, RTT, or like signatures at particular locations in a venue. In particular implementations, a radio heatmap may associate identities of one or more wireless transmitters 108 (e.g., a MAC address, which is discernible from a signal acquired from a local transmitter, etc.), expected RSSI from signals transmitted by the identified local transmitters, an expected RTT from the identified transmitters, means or standard deviations from these expected RSSI, RTT, etc. It should be understood, however, that these are merely examples of a radio heatmap, and that claimed subject matter is not limited in this respect. As was also indicated, at times, mobile device 102 may, for example, be capable of computing a position fix based, at least in part, on trilateration of a Field of View (FOV) of multiple POIs.

Even though a certain number of computing platforms or devices are illustrated herein, any number of suitable computing platforms or devices may be implemented to facilitate or otherwise support one or more techniques or processes associated with operating environment 100. For example, at times, network 112 may be coupled to one or more wired or wireless communications networks (e.g., Wi-Fi, etc.) so as to enhance a coverage area for communications with mobile device 102, one or more base transceiver stations 106, wireless transmitters 108, crowdsourcing servers 116, 118, 120, or the like. In some instances, network 112 may facilitate or support femtocell-based operative regions of coverage, for example. Again, these are merely example implementations, and claimed subject matter is not limited in this regard.

Figure 2:
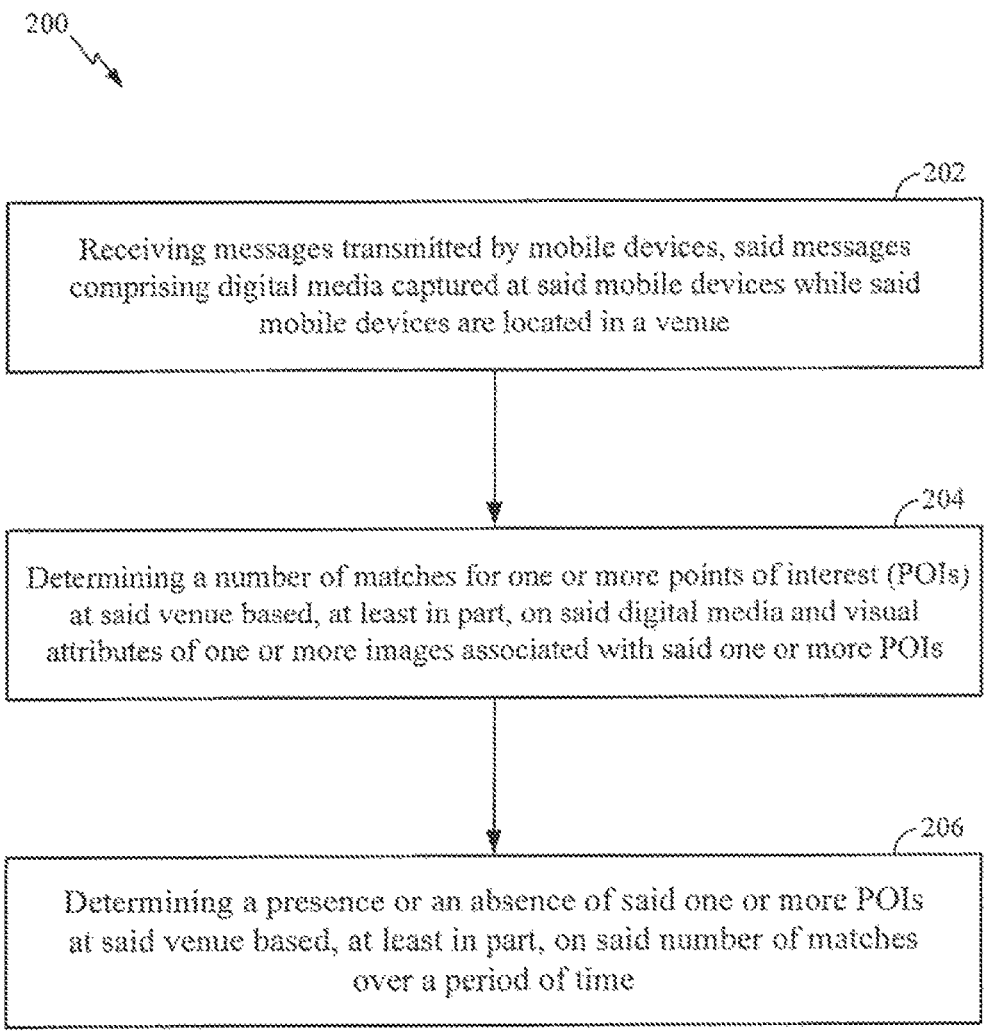
FIG. 2 is a flow diagram illustrating an implementation of an example process that may be performed to facilitate or support techniques for updating points of interest (POIs) for indoor positioning.

With this in mind, attention is now drawn to FIG. 2, which is a flow diagram illustrating an implementation of an example process 200 that may be performed, in whole or in part, to facilitate or support one or more operations or techniques for updating POIs. As was indicated, at times, process 200 may be implemented, at least in part, in connection with one or more crowdsourcing techniques, such as one or more users employing a co-located mobile device having an image capturing capability, such as mobile device 102 of FIG. 1, for example. It should be noted that information acquired or produced, such as, for example, input signals, output signals, operations, results, etc. associated with example process 200 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process may begin at operation 202, for example, with receiving messages transmitted by mobile devices, the messages comprising digital media captured at the mobile devices while the mobile devices are located in a venue. As was indicated, a user of a mobile device located in a venue may, for example, point or aim an associated image capturing device, such as a built-in camera toward a particular storefront, logo, etc., or may pan around the surroundings capturing an image of the storefront, logo, etc. on a digital media. In some instances, such as if certain visual features are not sufficiently captured or otherwise may not be useful (e.g., for visual signature matching, obtaining a position fix, etc.), a mobile device and/or crowdsourcing server may prompt a user for a repeated capturing and/or panning, panning at a slower rate, panning a larger area, or the like. A mobile device may, for example, transmit or communicate an image captured on a digital media to a crowdsourcing server (e.g., server 116, 118, 120, etc. of FIG. 1), such as via a suitable message using one or more communication links (e.g., link 110, 114, etc. of FIG. 1).

With regard to operation 204, a number of matches for one or more POIs at the venue may, for example, be determined based, at least in part, on the digital media and visual attributes of one or more images associated with the one or more POIs. A number of matches may, for example, be determined via a comparison of one or more visual features or attributes of crowdsourced digital images (e.g., storefront logo images, etc.) with visual features or attributes of known POIs, such as name signage, specific visual features, etc. In at least one implementation, one or more visual features or attributes of crowdsourced digital images may, for example, be compared with visual features or attributes of known POIs at a crowdsourcing server using one or more appropriate techniques. For example, a crowdsourcing server may access a suitable database, such as an image database for a particular venue, and may associate one or more visual features or attributes of one or more images extracted from digital media (e.g., captured logos, etc.) with reference images of logos stored in relation to known POIs (e.g., mapped to a floor of a venue, etc.) to determine if there is a match. Here, one or more candidate reference images of logos of known POIs having sufficiently similar visual features or attributes as one or more captured logo images may, for example, be identified as top matches using any suitable visual feature matching approach (e.g., a weighted comparison of metadata, context parameters, etc.). Subsequently, a best matching image may, for example, be selected, if any, as was indicated.

At operation 206, a presence or an absence of one or more POIs at the venue may, for example, be determined based, at least in part, on the number of matches over a period of time. For example, here, a presence or an absence of one or more POIs may be determined in connection with determining that at least one of the one or more POIs is no longer present in or visible from the venue, such as, for example, in response to a decrease in a number of matches or frequency of digital media matching attributes of the at least one POI over a time period. For example, a lack of or decrease in matches of extracted visual features or attributes (e.g., from digital media, etc.) with stored reference images of logos of a certain POI (e.g., images, etc.) over a certain time period, such as discussed above, despite on-going crowdsourcing within a venue, may indicate that the POI has transitioned out of the venue or a portion thereof. Thus, in at least one implementation, by counting a number of times a particular POI is detected by crowdsourcing users (e.g., captured on a camera and/or matched with reference images of logos in a database, etc.) over a time period, a lack of or decrease in POI detections may be observed, and a presence or absence of POIs may be determined and/or confirmed. Accordingly, if it is determined that a particular POI is no longer present in or visible from a venue, visual assistance or POI data may, for example, be updated in a suitable manner, such as by removing the POI-related data, such as its name, visual features, or other suitable attributes from a venue-specific image database, for example, as was also indicated. In some instances, this may also prove beneficial with respect to updating visual assistance or POI data in an image database for a venue in which one or more associated features are changed or updated in some manner on a continual basis (e.g., the garden area of the Bellagio® is redecorated, changed, or updated in some manner every month, etc.). For example, if it is determined, such as via one or more techniques discussed herein, that a number of POI matches decreases over time or if their presence increases over time, one or more appropriate or associated visual features may be updated accordingly, such as removed from an image database, for example. It should be noted that at least a portion of operations 202-206 may, for example, be implemented at or by a mobile device, other suitable server (e.g., visual assistance server, etc.), or any combination thereof.

Figure 3:
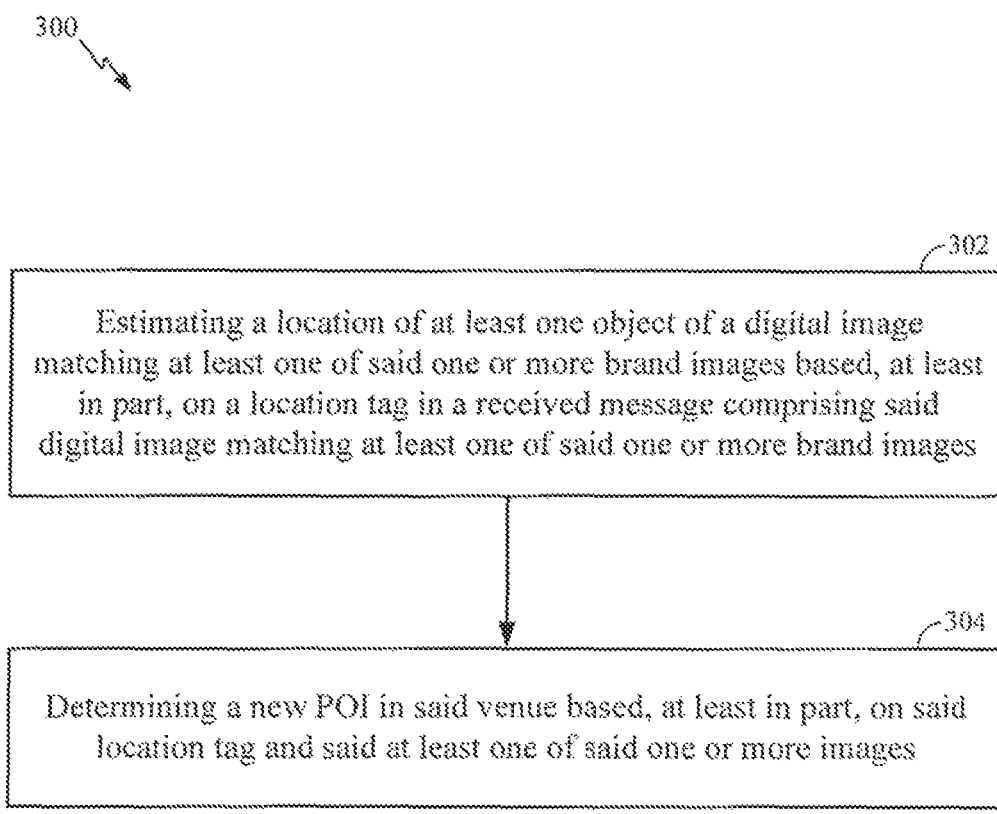
FIG. 3 is a flow diagram illustrating another implementation of an example process that may be performed to facilitate or support techniques for updating points of interest (POIs) for indoor positioning.

Attention is now drawn to FIG. 3, which is a flow diagram illustrating another implementation of an example process, referenced herein at 300, that may be used, at least in part, to facilitate or support one or more operations or techniques for updating POIs, such as via determining a presence or an absence of one or more POIs in a venue of interest, for example. Likewise, process 300 may, for example, be performed, at least in part, to facilitate or support one or more operations or techniques for updating POIs, such as via one or more crowdsourcing users employing a co-located mobile device having an image capturing capability (e.g., mobile device 102 of FIG. 1, etc.). Similarly, it should be noted that information acquired or produced, such as, for example, input signals, output signals, operations, results, etc. associated with example process 300 may be represented via one or more digital signals. It should also be appreciated that even though one or more operations are illustrated or described concurrently or with respect to a certain sequence, other sequences or concurrent operations may be employed. In addition, although the description below references particular aspects or features illustrated in certain other figures, one or more operations may be performed with other aspects or features.

Example process 300 (e.g., for determining a presence or an absence of one or more POIs at a venue, etc.) may, for example, begin at operation 302 with estimating a location of at least one object of a digital image matching at least one of the one or more images based, at least in part, on a location tag in a received message comprising the digital image matching at least one of the one or more images. For example, similarly to operation 202 of FIG. 2, here, one or more crowdsourcing users may communicate messages comprising digital images of objects captured at mobile devices while the mobile devices are located in a venue. At times, digital images of objects may comprise, for example, logos representative of specific visual signatures of landmarks within a venue. In some instances, in addition to a digital image of an object, a message from the mobile device may further include a location tag indicating, for example, an estimated location of a mobile device while the digital image was captured, and/or an estimated location of a captured object (e.g., a landmark, etc.) in the digital image. An estimated location of a mobile device and/or captured object may be identified and/or provided with reference to any suitable coordinate system, such as a two-dimensional (X, Y), three-dimensional (X, Y, Z), etc. coordinate system relative to a local reference frame (e.g., a floor plan of a venue, etc.), global reference frame (e.g., Earth-centered coordinates, etc.), or any combination thereof.

In some instances, based, at least in part, on a location tag and a possible match between visual features or attributes extracted from digital images and reference images of logos stored in a comprehensive image database, a crowdsourcing server may estimate a location of the object (e.g., a POI, etc.), for example, and make one or more object-related inferences or determinations, such as discussed below. Here, a possible match between visual features or attributes extracted from digital images and reference images of logos may, for example, be determined in connection with accessing a comprehensive image database. For example, a comprehensive image database may comprise one or more reference logos associated with a good or service and/or indicative of a source of a good or service. As such, a comprehensive image database may include, for example, a much broader set of images, brand or otherwise, and/or their visual features or attributes than what is in a current venue (e.g., a venue where mobile devices are currently located, etc.). A comprehensive image database may include, for example, images, visual features or attributes, etc. of numerous possible POIs associated with a plurality of venues, vendors, retailers, etc., such as brand name signage, trade dress, a set of logos or images used by business entities (e.g., a store chain, retail enterprise, etc.) to identify one or more storefronts (e.g., POIs, etc.), or the like. Here, visual features or attributes extracted from digital images, such as discussed above, may, for example, be compared with reference images of logos in a comprehensive image database to determine if there is a match. Likewise, a best or otherwise suitable candidate image of a logo representative of a specific visual signature associated with a POI of interest may, for example, be selected, such as using one or more techniques discussed above. The terms "comprehensive image database," "universal image database," and "universal image feature database" may be used interchangeably herein.

With regard to operation 304, a new POI in the venue may, for example, be determined based, at least in part, on the location tag and the at least one of the one or more images. Here, a crowdsourcing server may, for example, compare captured digital images with visual features or attributes stored in a comprehensive image database to determine if there is a match, such as discussed above. If visual features or attributes of an image matching a captured digital image do not correspond with visual features or attributes of a POI expected to be located in a venue at a location specified via a received location tag, a crowdsourcing server may, for example, determine that a new POI has been established in the venue. A database of POIs for a particular venue of interest (e.g., a venue-specific image database, etc.) may then be updated to include, for example, any suitable attributes for a newly discovered POI, such as a name, brand, location, corresponding visual features or attributes, or the like, if applicable, as also discussed.

In addition, at times, a crowdsourcing server may determine that a newly discovered POI may have replaced a POI previously determined to may have exited a venue, such as from a decrease in a number of matches or frequency of digital images matching POI's visible attributes, as discussed above. For example, if an estimated location of a newly discovered POI obtained from a location tag via a crowdsourced message corresponds with a location of an exited POI, it may be determined that the newly discovered POI has replaced the exited POI in a venue. As a way of illustration, if a POI detection count for Sears® by crowdsourcing users in a particular shopping mall has decreased in recent months, and if Sears® is located in a line of sight and/or in close proximity to a location of users capturing logos of Macy's® (e.g., obtained from location tags), it may be determined that Macy's® may have replaced Sears®. In some instances, such a determination may be performed in connection with an electronic digital map of a venue, such as a shopping mall having a set of logos mapped to a floor plan so as to identify one or more relevant POIs located within the mall, just to illustrate one possible implementation. Likewise, a database of POIs for a particular venue may then be updated (e.g., information for an exited POI may be deleted, information for a new POI added, etc.). Similarly, it should be noted that at least a portion of operations 302-308 may be implemented at or by a mobile device, other suitable server (e.g., visual assistance server, etc.), or any combination thereof.

Figure 4:
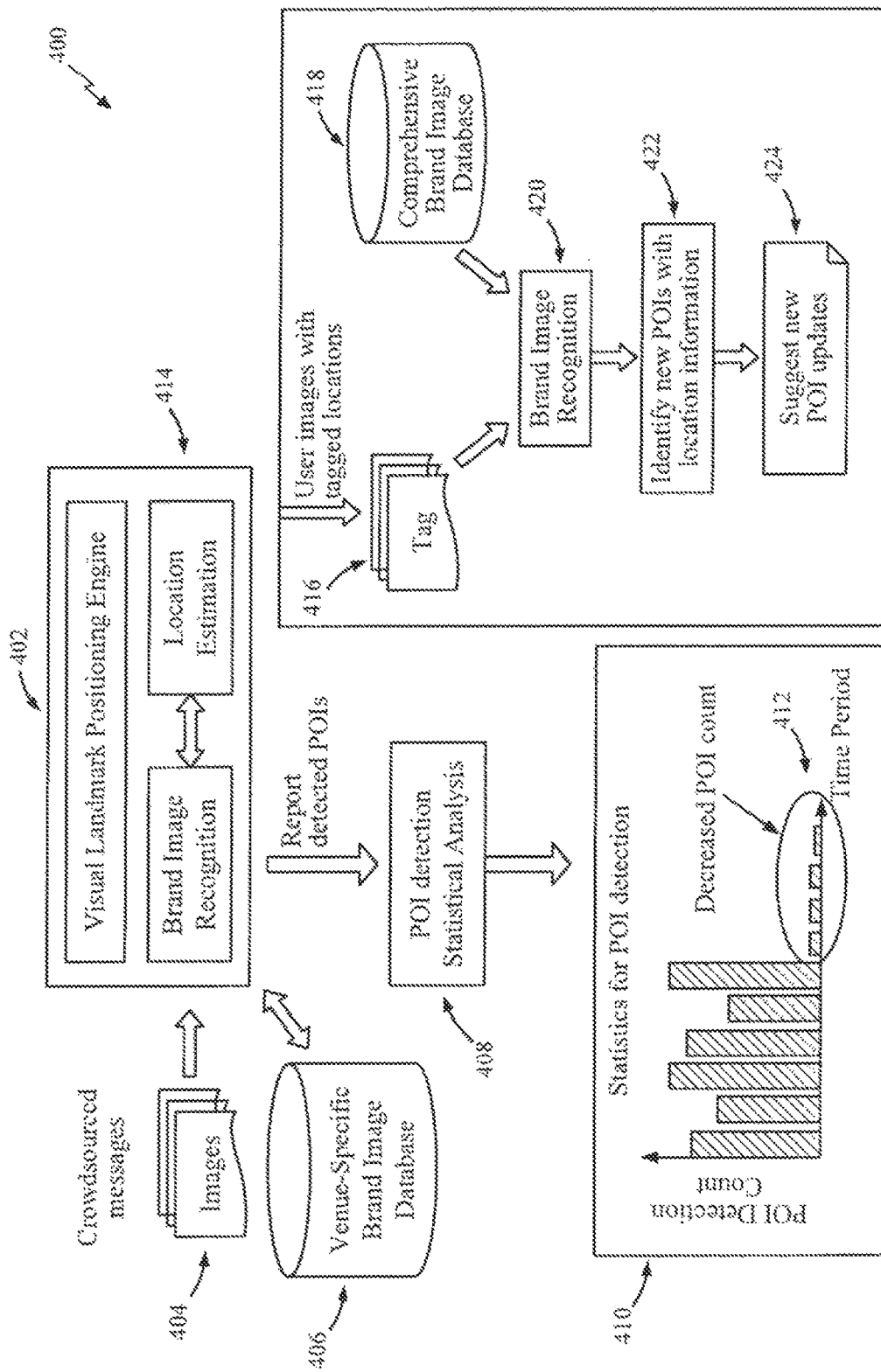
FIG. 4 is a flow diagram of an implementation of a process illustrating an example use case of updating points of interest (POIs) for indoor positioning.

FIG. 4 is a flow diagram of an implementation of a process 400 illustrating an example use case or scenario of updating POIs, such as, for example, performed in connection with a Visual Landmark Positioning Engine, referenced generally at 402. As indicated at 404 and 406, respectively, crowdsourced images captured on a digital media may, for example be transmitted (e.g., via mobile device 102 of FIG. 1) to a suitable server (e.g., crowdsourcing server 116, 118, 120, etc. of FIG. 1), such as to perform one or more image recognition operations or techniques in connection with accessing a venue-specific image database, such as discussed above. In some instances, Visual Landmark Positioning Engine 402 may, for example, assemble a report of POIs detected by crowdsourcing users over a certain time period and may communicate the report to a suitable server, such as to perform a statistical analysis of POI detections, as illustrated at 408. At times, a statistical analysis may, for example, be performed in connection with associating digital images of POIs captured on a digital media with attributes of one or more POIs expected to be located in or visible from a venue to determine matches of the digital media with the POIs, as also discussed above. Based, at least in part, on a statistical analysis, indicated generally at 410, a server may, for example, observe that a count of POI detections by crowdsourcing users for a certain known POI expected to be located in or visible from a venue has decreased over time, as shown at 412. As a result, here, a server may, for example, determine that a certain POI has transitioned from a venue (e.g., moved out, relocated, etc.). Any visual assistance or POI data may then be updated based on a POI that is presumed to be no longer present by, for example, removing a name, visual features or attributes, etc. of the POI from venue-specific image database, as was also indicated.

In some instances, as illustrated at 414, Visual Landmark Positioning Engine 402 may, for example, communicate with a suitable server so as to estimate a location of at least one object of a digital image (e.g., a landmark, etc.) matching at least one of one or more images in a suitable database. For example, as shown at 416, a location of an object may be estimated based, at least in part, on a location tag in a message received from a crowdsourcing mobile device and comprising a digital image matching at least one of one or more images in a more comprehensive image database 418. As previously discussed, a crowdsourcing server may compare captured digital images with attributes stored in database 418 to determine a match, as indicated at 420, and may determine and/or identify a newly discovered POI, such as if attributes of an image matching a captured digital image do not correspond with a location of a POI already indicated in a database of POIs for a venue, for example, as indicated at 422. A crowdsourcing server, such as in connection with Visual Landmark Positioning Engine 402 may, for example, also determine that a newly discovered POI may have replaced a POI determined to have exited a venue (e.g., from a decrease in a number of matches or frequency of digital images matching visible attributes, etc.). For example, if an estimated location of a newly discovered POI (e.g., obtained from a location tag in a crowdsourced message, etc.) corresponds with a location of an exited POI, a server may determine that the newly discovered POI has replaced the exited POI in a venue. As was also discussed and as referenced at 424, based, at least in part, on one or more determinations discussed above, a suitable database (e.g., a venue-specific image database, etc.) may be updated in some manner, such as to include, for example, any suitable data for a newly discovered POI, such as its name, brand, location, corresponding visual features or attributes, or the like, if applicable.

Figure 5:
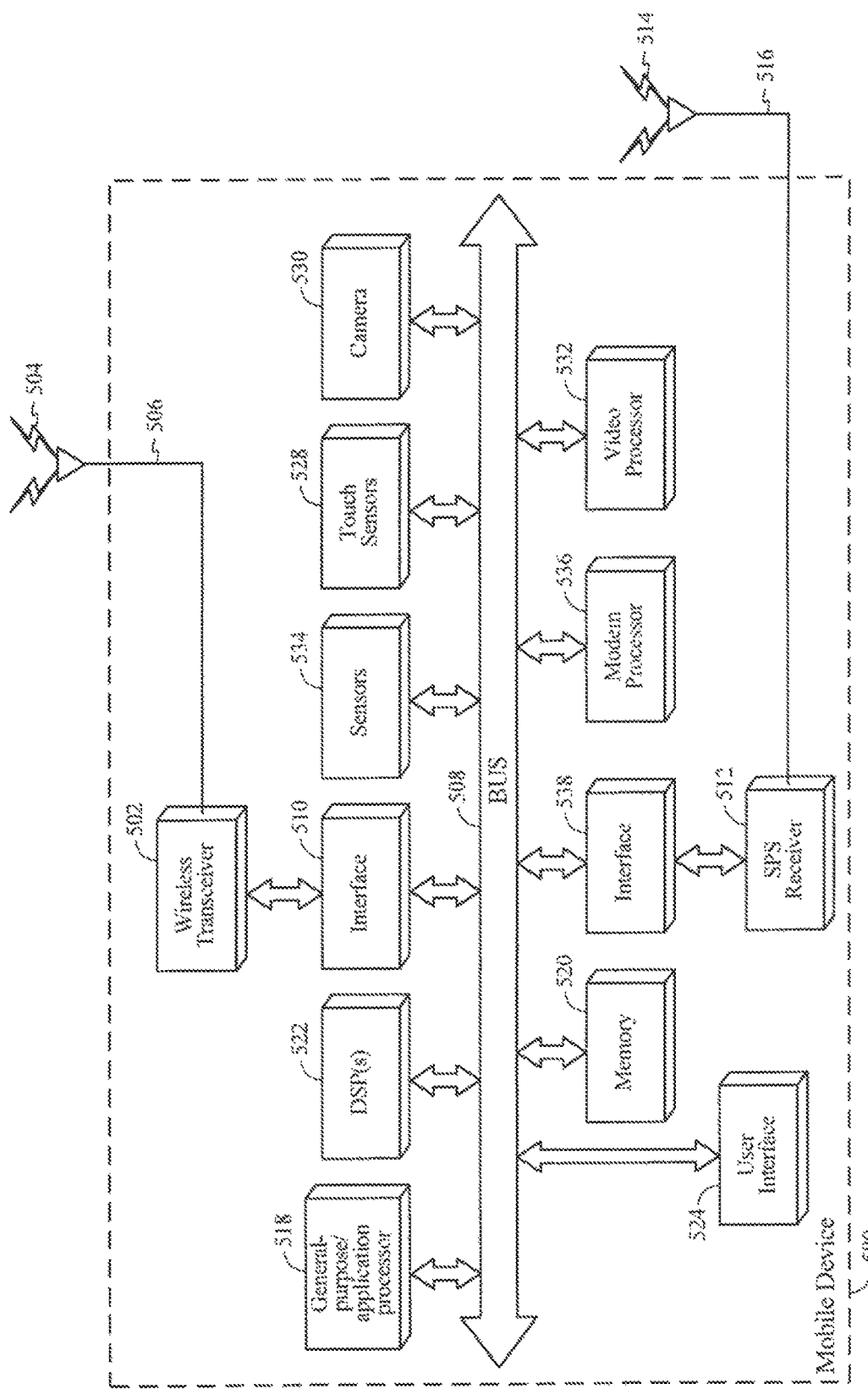
FIG. 5 is a schematic diagram illustrating an implementation of an example computing environment associated with a mobile device.

FIG. 5 is a schematic diagram of an implementation of an example computing environment associated with a mobile device that may be used, at least in part, to facilitate or support one or more operations or techniques for updating POIs. An example computing environment may comprise, for example, a mobile device 500 that may include one or more features or aspects of mobile device 102 of FIG. 1, though claimed subject matter is not so limited. For example, in some instances, mobile device 500 may comprise a wireless transceiver 502 capable of transmitting or receiving wireless signals, referenced generally at 504, such as via an antenna 506 over a suitable wireless communications network. Wireless transceiver 502 may, for example, be coupled or connected to a bus 508 via a wireless transceiver bus interface 510. Depending on an implementation, at times, wireless transceiver bus interface 510 may, for example, be at least partially integrated with wireless transceiver 502. Some implementations may include multiple wireless transceivers 502 or antennas 506 so as to enable transmitting or receiving signals according to a corresponding multiple wireless communication standards such as Wireless Fidelity (WiFi), Code Division Multiple Access (CDMA), Wideband-CDMA (W-CDMA), Long Term Evolution (LTE), Bluetooth®, just to name a few examples.

In an implementation, mobile device 500 may, for example, comprise an SPS receiver 512 capable of receiving or acquiring one or more SPS signals 514, such as via an SPS antenna 516. SPS receiver 512 may process, in whole or in part, one or more acquired SPS signals 514 for estimating a location of mobile device 500. In some instances, one or more general-purpose application processors 518, memory 520, digital signal processor(s) (DSP) 522, or like specialized devices or processors not shown may be utilized to process acquired SPS signals 514, in whole or in part, calculate a location of mobile device 500, such as in conjunction with SPS receiver 512, or the like. Storage of SPS or other signals for implementing one or more positioning operations, such as in connection with logo detection, for example, may be performed, at least in part, in memory 520, suitable registers or buffers (not shown). Although not shown, it should be appreciated that in at least one implementation one or more processors 518, memory 520, DSPs 522, or like specialized devices or processors may comprise one or more image processing modules capable of transmitting messages comprising digital media captured at mobile device 500 while mobile device 500 is located in a venue, such as for determining a number of matches for one or more POIs at the venue based, at least in part, on the digital media and visual attributes of one or more images associated with the one or more POIs; and determining a presence or an absence of the one or more POIs at the venue based, at least in part, on the number of matches over a period of time. It should also be noted that all or part of one or more image processing modules may be implemented using or otherwise including hardware, firmware, software, or any combination thereof.

As illustrated, DSP 522 may be coupled or connected to processor 518 and memory 520 via bus 508. Although not shown, in some instances, bus 508 may comprise one or more bus interfaces that may be integrated with one or more applicable components of mobile device 500, such as DSP 522, processor 518, memory 520, or the like. In various embodiments, one or more operations or functions described herein may be performed in response to execution of one or more machine-readable instructions stored in memory 520, such as on a computer-readable storage medium, such as RAM, ROM, FLASH, disc drive, etc., just to name a few examples. Instructions may, for example, be executable via processor 518, one or more specialized processors not shown, DSP 522, or the like. Memory 520 may comprise a non-transitory processor-readable memory, computer-readable memory, etc. that may store software code (e.g., programming code, instructions, etc.) that may be executable by processor 518, DSP 522, or the like to perform operations or functions described herein.

Mobile device 500 may comprise a user interface 524, which may include any one of several devices such as, for example, a speaker, microphone, display device, vibration device, keyboard, touch screen, etc., just to name a few examples. In at least one implementation, user interface 524 may enable a user to interact with one or more applications hosted on mobile device 500. For example, one or more devices of user interface 524 may store analog or digital signals on memory 520 to be further processed by DSP 522, processor 518, etc. in response to input or action from a user. Similarly, one or more applications hosted on mobile device 500 may store analog or digital signals in memory 520 to present an output signal to a user. As seen, mobile device 500 may comprise one or more touch sensors 528 responsive to touching or like pressure applied on a keyboard, touch screen, or the like.

In an implementation, mobile device 500 may comprise, for example, a camera 530, dedicated or otherwise, such as for capturing still or moving imagery. Camera 530 may comprise, for example, a camera sensor or like imaging device (e.g., charge coupled device, complementary metal oxide semiconductor (CMOS)-type imager, etc.), lens, analog to digital circuitry, frame buffers, etc., just to name a few examples. In some instances, additional processing, conditioning, encoding, or compression of signals representing one or more captured images may, for example, be performed, at least in part, at processor 518, DSP 522, or the like. Optionally or alternatively, a video processor 532, dedicated or otherwise, may perform conditioning, encoding, compression, or manipulation of signals representing one or more captured images. Additionally, video processor 532 may, for example, decode or decompress one or more stored images for presentation on a display (not shown) of mobile device 500.

Mobile device 500 may comprise one or more sensors 534 coupled or connected to bus 508, such as, for example, one or more inertial sensors, ambient environment sensors, or the like. Inertial sensors of sensors 534 may comprise, for example, one or more accelerometers (e.g., collectively responding to acceleration of mobile device 500 in one, two, or three dimensions, etc.), gyroscopes or magnetometers (e.g., to support one or more compass applications, etc.), etc., just to illustrate a few examples. Ambient environment sensors of mobile device 500 may comprise, for example, one or more temperature sensors, barometric pressure sensors, ambient light detectors, camera sensors, microphones, etc., just to name few examples. Sensors 534 may generate analog or digital signals that may be stored in memory 520 and may be processed by DSP 522, processor 518, etc., such as in support of one or more applications directed to positioning or navigation operations, communications, gaming or the like.

In a particular implementation, mobile device 500 may comprise a modem processor 536, dedicated or otherwise, capable of performing baseband processing of signals received or downconverted via wireless transceiver 502, SPS receiver 512, or the like. Similarly, modem processor 536 may perform baseband processing of signals to be upconverted for transmission via wireless transceiver 502, for example. In alternative implementations, instead of having a dedicated modem processor, baseband processing may be performed, at least in part, by processor 518, DSP 522, or the like. In addition, in some instances, an interface 538, although illustrated as a separate component, may be integrated, in whole or in part, with one or more applicable components of mobile device 500, such as bus 508 or SPS receiver 512, for example. Optionally or alternatively, SPS receiver 512 may be coupled or connected to bus 508 directly. It should be understood, however, that these are merely examples of components or structures that may perform baseband processing, and that claimed subject matter is not limited in this regard.

Figure 6:
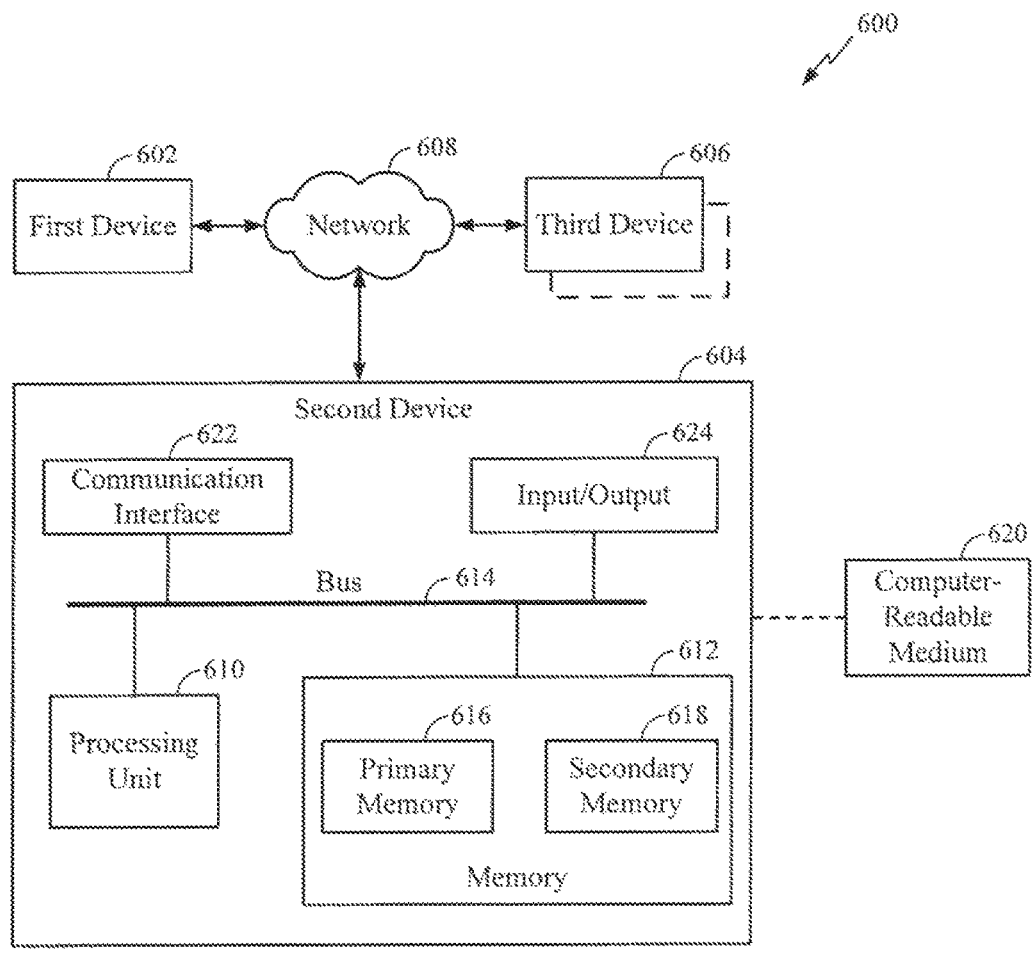
FIG. 6 is a schematic diagram illustrating an implementation of an example computing environment associated with a server.

FIG. 6 is a schematic diagram illustrating an implementation of an example computing environment or system 600 that may be associated with or include one or more servers or other devices capable of partially or substantially implementing or supporting one or more operations or processes for updating POIs, such as discussed above in connection with FIGS. 1-5, for example. Computing environment 600 may include, for example, a first device 602, a second device 604, a third device 606, etc., which may be operatively coupled together via a communications network 608. In some instances, first device 602 may comprise a server capable of providing positioning assistance data, such as discussed above. First device 602 may also comprise a server capable of providing a location based, at least in part, on a location tag, as was also indicated. First device 602 may also comprise a server capable of providing positioning assistance data relevant to a location of an LCI specified in a request from a mobile device. Second device 604 or third device 606 may comprise, for example, mobile devices, just to illustrate one possible implementation. In addition, communications network 608 may comprise one or more wireless transmitters, such as access points, femtocells, or the like. Of course, claimed subject matter is not limited in scope in these respects.

First device 602, second device 604, or third device 606 may be representative of any device, appliance, platform, or machine that may be capable of exchanging information over communications network 608. By way of example but not limitation, any of first device 602, second device 604, or third device 606 may include: one or more computing devices or platforms, such as, for example, a desktop computer, a laptop computer, a workstation, a server device, or the like; one or more personal computing or communication devices or appliances, such as, for example, a personal digital assistant, mobile communication device, or the like; a computing system or associated service provider capability, such as, for example, a database or information storage service provider/system, a network service provider/system, an Internet or intranet service provider/system, a portal or search engine service provider/system, a wireless communication service provider/system; or any combination thereof. Any of first, second, or third devices 602, 604, and 606, respectively, may comprise one or more of a mobile device, wireless transmitter or receiver, server, etc. in accordance with example implementations described herein.

In an implementation, communications network 608 may be representative of one or more communication links, processes, or resources capable of supporting an exchange of information between at least two of first device 602, second device 604, or third device 606. By way of example but not limitation, communications network 608 may include wireless or wired communication links, telephone or telecommunications systems, information buses or channels, optical fibers, terrestrial or space vehicle resources, local area networks, wide area networks, intranets, the Internet, routers or switches, and the like, or any combination thereof. As illustrated, for example, via a dashed lined box partially obscured by third device 606, there may be additional like devices operatively coupled to communications network 608. It is also recognized that all or part of various devices or networks shown in computing environment 600, or processes or methods, as described herein, may be implemented using or otherwise including hardware, firmware, software, or any combination thereof.

By way of example but not limitation, second device 604 may include at least one processing unit 610 that may be operatively coupled to a memory 612 via a bus 614. Processing unit 610 may be representative of one or more circuits capable of performing at least a portion of a suitable computing procedure or process. For example, processing unit 610 may include one or more processors, controllers, microprocessors, microcontrollers, application specific integrated circuits, digital signal processors, programmable logic devices, field programmable gate arrays, or the like, or any combination thereof. Although not shown, second device 604 may include a location-tracking unit that may obtain a position fix, coarse or otherwise, of a suitable mobile device, such as in a venue of interest, for example, based, at least in part, on one or more received or acquired wireless signals, such as from an SPS, one or more Wi-Fi access points, etc., in connection with landmark-type positioning, electronic digital map, etc. In some implementations, a location-tracking unit may be at least partially integrated with a suitable processing unit, such as processing unit 610, for example, though claimed subject matter is not so limited. In certain server-based or server-supported implementations, processing unit 610 may, for example, comprise means for receiving messages transmitted by mobile devices, the messages comprising digital media captured at the mobile devices while the mobile devices are located in a venue, such as to facilitate or support operation 202 of FIG. 2, at least in part. In some instances, processing unit 610 may, for example, comprise means for determining a number of matches for one or more POIs at the venue based, at least in part, on the digital media and visual attributes of one or more images associated with the one or more POIs, such as to facilitate or support operation 204 of FIG. 2, for example. Depending on an implementation, processing unit 610 may also comprise, for example, means for determining a presence or an absence of one or more POIs at the venue based, at least in part, on the number of matches over a period of time, such as to facilitate or support operation 206 of FIG. 2, at least in part.

According to an implementation, processing unit 610 may also comprise, for example, means for estimating a location of at least one object of a digital image matching at least one of the one or more images based, at least in part, on a location tag in a received message comprising the digital image matching at least one of the one or more images, such as to facilitate or support operation 302 of FIG. 3, at least in part. In addition, in at least one implementation, processing unit 610 may comprise, for example, means for determining a new POI in the venue based, at least in part, on the location tag and the at least one of the one or more images, such as to facilitate or support operation 304 of FIG. 3, at least in part.

Memory 612 may be representative of any information storage mechanism or appliance. Memory 612 may include, for example, a primary memory 616 and a secondary memory 618. Primary memory 616 may include, for example, a random access memory, read only memory, etc. While illustrated in this example as being separate from processing unit 610, it should be understood that all or part of primary memory 616 may be provided within or otherwise co-located/coupled with processing unit 610. Secondary memory 618 may include, for example, same or similar type of memory as primary memory or one or more information storage devices or systems, such as, for example, a disk drive, an optical disc drive, a tape drive, a solid state memory drive, etc. In certain implementations, secondary memory 618 may be operatively receptive of, or otherwise configurable to couple to, a computer-readable medium 620. Computer-readable medium 620 may include, for example, any non-transitory storage medium that may carry or make accessible information, code, or instructions for one or more of devices in computing environment 600. Computer-readable medium 620 may also be referred to as a storage medium.

Second device 604 may include, for example, a communication interface 622 that may provide for or otherwise support an operative coupling of second device 604 to at least communications network 608. By way of example but not limitation, communication interface 622 may include a network interface device or card, a modem, a router, a switch, a transceiver, and the like. Second device 604 may also include, for example, an input/output device 624. Input/output device 624 may be representative of one or more devices or features that may be configurable to accept or otherwise introduce human or machine inputs, or one or more devices or features that may be capable of delivering or otherwise providing for human or machine outputs. By way of example but not limitation, input/output device 624 may include an operatively configured display, speaker, keyboard, mouse, trackball, touch screen, information port, or the like.

Methodologies described herein may be implemented by various means depending upon applications according to particular features or examples. For example, methodologies may be implemented in hardware, firmware, software, discrete/fixed logic circuitry, any combination thereof, and so forth. In a hardware or logic circuitry implementation, for example, a processing unit may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other devices or units designed to perform the functions described herein, or combinations thereof, just to name a few examples.

For a firmware or software implementation, methodologies may be implemented with modules (e.g., procedures, functions, etc.) having instructions that perform functions described herein. Any computer-readable medium tangibly embodying instructions may be used in implementing methodologies described herein. For example, software codes may be stored in a memory and executed by a processor. Memory may be implemented within the processor or external to the processor. As used herein the term "memory" refers to any type of long term, short term, volatile, non-volatile, or other memory and is not to be limited to any particular type of memory or number of memories, or type of media upon which memory is stored. In at least some implementations, one or more portions of the herein described storage media may store signals representative of information as expressed by a particular state of the storage media. For example, an electronic signal representative of information may be "stored" in a portion of the storage media (e.g., memory) by affecting or changing the state of such portions of the storage media to represent information as binary information (e.g., via ones and zeros). As such, in a particular implementation, such a change of state of the portion of the storage media to store a signal representative of information constitutes a transformation of storage media to a different state or thing.

As was indicated, in one or more example implementations, the functions described may be implemented in hardware, software, firmware, discrete/fixed logic circuitry, some combination thereof, and so forth. If implemented in software, the functions may be stored on a physical computer-readable medium as one or more instructions or code. Computer-readable media include physical computer storage media. A storage medium may be any available physical medium that may be accessed by a computer. By way of example, and not limitation, such computer-readable media may comprise RAM, ROM, EEPROM, CD-ROM or other optical disc storage, magnetic disk storage or other magnetic storage devices, or any other medium that may be used to store desired program code in the form of instructions or information structures and that may be accessed by a computer or processor thereof. Disk and disc, as used herein, includes compact disc (CD), laser disc, optical disc, digital versatile disc (DVD), floppy disk and blue-ray disc where disks usually reproduce information magnetically, while discs reproduce information optically with lasers.

As discussed above, a mobile device may be capable of communicating with one or more other devices via wireless transmission or receipt of information over various communications networks using one or more wireless communication techniques. Here, for example, wireless communication techniques may be implemented using a wireless wide area network (WWAN), a wireless local area network (WLAN), a wireless personal area network (WPAN), or the like. The term "network" and "system" may be used interchangeably herein. A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, a Long Term Evolution (LTE) network, a WiMAX (IEEE 802.16) network, and so on. A CDMA network may implement one or more radio access technologies (RATs) such as cdma2000, Wideband-CDMA (W-CDMA), Time Division Synchronous Code Division Multiple Access (TD-SCDMA), to name just a few radio technologies. Here, cdma2000 may include technologies implemented according to IS-95, IS-2000, and IS-856 standards. A TDMA network may implement Global System for Mobile Communications (GSM), Digital Advanced Mobile Phone System (D-AMPS), or some other RAT. GSM and W-CDMA are described in documents from a consortium named "3rdGeneration Partnership Project" (3GPP). Cdma2000 is described in documents from a consortium named "3rd Generation Partnership Project 2" (3GPP2). 3GPP and 3GPP2 documents are publicly available. A WLAN may include an IEEE 802.11x network, and a WPAN may include a Bluetooth network, an IEEE 802.15x, or some other type of network, for example. The techniques may also be implemented in conjunction with any combination of WWAN, WLAN, or WPAN. Wireless communication networks may include so-called next generation technologies (e.g., "4G"), such as, for example, Long Term Evolution (LTE), Advanced LTE, WiMAX, Ultra Mobile Broadband (UMB), or the like.

In an implementation, a mobile device may, for example, be capable of communicating with one or more femtocells, such as for the purpose of estimating its location, obtaining assistance information, extending cellular telephone service into a business or home, or the like. As used herein, "femtocell" refers to one or more smaller-size cellular base stations that may be capable of detecting a wireless signal transmitted from a mobile device using one or more appropriate techniques. Typically, although not necessarily, a femtocell may utilize or otherwise be compatible with various types of communication technology such as, for example, Universal Mobile Telecommunications System (UTMS), Long Term Evolution (LTE), Evolution-Data Optimized or Evolution-Data only (EV-DO), GSM, Worldwide Interoperability for Microwave Access (WiMAX), Code division multiple access (CDMA)-2000, or Time Division Synchronous Code Division Multiple Access (TD-SCDMA), to name just a few examples among many possible. In certain implementations, a femtocell may comprise integrated WiFi, for example, and may provide a mobile device access to a larger cellular telecommunication network by way of another broadband network, such as the Internet. However, such details relating to femtocells are merely examples, and claimed subject matter is not so limited.

Techniques described herein may be used with an SPS that includes any one of several GNSS or combinations of GNSS. Furthermore, techniques may be used with positioning systems that utilize terrestrial transmitters acting as "pseudolites", or a combination of SVs and such terrestrial transmitters. Terrestrial transmitters may, for example, include ground-based transmitters that broadcast a PN code or other ranging code (e.g., similar to a GPS or CDMA cellular signal, etc.). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "space vehicle" (SV), as used herein, is intended to include terrestrial transmitters acting as pseudolites, equivalents of pseudolites, and possibly others. The terms "SPS signals" or "SV signals", as used herein, is intended to include SPS-like signals from terrestrial transmitters, including terrestrial transmitters acting as pseudolites or equivalents of pseudolites.

Also, computer-readable code or instructions may be transmitted via signals over physical transmission media from a transmitter to a receiver (e.g., via electrical digital signals). For example, software may be transmitted from a website, server, or other remote source using a coaxial cable, fiber optic cable, twisted pair, digital subscriber line (DSL), or physical components of wireless technologies such as infrared, radio, and microwave. Combinations of the above may also be included within the scope of physical transmission media. Such computer instructions may be transmitted in portions (e.g., first and second portions) at different times (e.g., at first and second times). Some portions of this Detailed Description are presented in terms of algorithms or symbolic representations of operations on binary digital signals stored within a memory of a specific apparatus or special purpose computing device or platform. In the context of this particular Specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated.

It has proven convenient at times, principally for reasons of common usage, to refer to signals as bits, information, values, elements, symbols, characters, variables, terms, numbers, numerals, or the like. It should be understood, however, that all of these or similar terms are to be associated with appropriate physical quantities and are merely convenient labels. Unless specifically stated otherwise, as is apparent from the discussion above, it is appreciated that throughout this Specification discussions utilizing terms such as "processing," "computing," "calculating," "determining," "ascertaining," "identifying," "associating," "measuring," "performing," or the like refer to actions or processes of a specific apparatus, such as a special purpose computer or a similar special purpose electronic computing device. In the context of this Specification, therefore, a special purpose computer or a similar special purpose electronic computing device is capable of manipulating or transforming signals, typically represented as physical electronic, electrical, or magnetic quantities within memories, registers, or other information storage devices, transmission devices, or display devices of the special purpose computer or similar special purpose electronic computing device.

Terms, "and," "or," and "and/or" as used herein, may include a variety of meanings that also is expected to depend at least in part upon the context in which such terms are used. Typically, "or" if used to associate a list, such as A, B, or C, is intended to mean A, B, and C, here used in the inclusive sense, as well as A, B, or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. In addition, the term "one or more" as used herein may be used to describe any feature, structure, or characteristic in the singular or may be used to describe some combination of features, structures or characteristics. Though, it should be noted that this is merely an illustrative example and claimed subject matter is not limited to this example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While certain example techniques have been described and shown herein using various methods or systems, it should be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to particular examples disclosed, but that such claimed subject matter may also include all implementations falling within the scope of the appended claims, and equivalents thereof.

What is claimed is:

1. A method comprising, at a computing platform:
   receiving messages transmitted by mobile devices, said messages comprising digital media captured at said mobile devices while said mobile devices are located in a venue;
   determining a number of matches for one or more points of interest (POIs) at said venue based, at least in part, on said digital media and visual attributes of one or more images associated with said one or more POIs; and
   determining a presence or an absence of said one or more POIs at said venue based, at least in part, on a statistical analysis indicating a decrease in counts of said number of matches over a period of time.

2. The method of claim 1, wherein said one or more POIs comprise one or more POIs expected to be located in or visible from said venue.

3. The method of claim 1, wherein said determining said presence or said absence of said one or more POIs further comprises determining that at least one of said one or more POIs is no longer present in or visible from said venue in response to said decrease in said number of matches for said one or more POIs at said venue over said time period.

4. The method of claim 3, and further comprising updating POI data based, at least in part, on said determining that said at least one of said one or more POIs is no longer present in or visible from said venue.

5. The method of claim 4, wherein said updating said POI data comprises removing said visual attributes of said at least one of said one or more POIs from a database.

6. The method of claim 1, wherein said determining said presence or said absence of said one or more POIs further comprises:
   estimating a location of at least one object of a digital image matching at least one of said one or more images based, at least in part, on a location tag in a received message comprising said digital image matching at least one of said one or more images; and
   determining a new POI in said venue based, at least in part, on said location tag and said at least one of said one or more images.

7. The method of claim 6, wherein said determining said new POI in said venue further comprises determining that said new POI has replaced an existing POI based, at least in part, on a comparison of said location tag with a location of said existing POI and said decrease in said number of matches for said one or more POIs at said venue over said time period.

8. An apparatus comprising:
   means for receiving messages transmitted by mobile devices, said messages comprising digital media captured at said mobile devices while said mobile devices are located in a venue;
   means for determining a number of matches for one or more POIs at said venue based, at least in part, on said digital media and visual attributes of one or more images associated with said one or more POIs; and
   means for determining a presence or an absence of said one or more POIs at said venue based, at least in part, on a statistical analysis indicating a decrease in counts of said number of matches over a period of time.

9. The apparatus of claim 8, wherein said one or more POIs comprise one or more POIs expected to be located in or visible from said venue.

10. The apparatus of claim 8, wherein said means for determining said presence or said absence of said one or more POIs further comprise means for determining that at least one of said one or more POIs is no longer present in or visible from said venue in response to said decrease in said number of matches for said one or more POIs at said venue over said time period.

11. The apparatus of claim 10, and further comprising means for updating POI data based, at least in part, on said determining that said at least one of said one or more POIs is no longer present in or visible from said venue.

12. The apparatus of claim 11, wherein said means for updating said POI data comprises means for removing said visual attributes of said at least one of said one or more POIs from a database.

13. The apparatus of claim 12, wherein said database comprises an image database for said venue having: said one or more images of said one or more POIs; visual features of said one or more POIs; or any combination thereof.

14. The apparatus of claim 8, wherein said means for determining said presence or said absence of said one or more POIs further comprise:
   means for estimating a location of at least one object of a digital image matching at least one of said one or more images based, at least in part, on a location tag in a received message comprising said digital image matching at least one of said one or more images; and
   means for determining a new POI in said venue based, at least in part, on said location tag and said at least one of said one or more images.

15. The apparatus of claim 14, and further comprising means for obtaining said visual attributes of said one or more images from a comprehensive image database that includes one or more logos associated with a good or service or indicative of a source of said good or said service.

16. The apparatus of claim 14, wherein said means for determining said new POI in said venue further comprise means for determining that said new POI has replaced an existing POI based, at least in part, on a comparison of said location tag with a location of said existing POI and said decrease in said number of matches for said one or more POIs at said venue over said time period.

17. The apparatus of claim 14, wherein said location tag indicates: an estimated location of at least one of said mobile devices at a time said at least one object of said digital image was captured; an estimated location of said at least one object in said venue; or any combination thereof.

18. The apparatus of claim 14, and further comprising means for updating POI data based, at least in part, on said determining said new POI in said venue.

19. The apparatus of claim 18, wherein said means for updating said POI data comprise: means for including a name of said new POI in an image database for said venue; means for including said visual attributes of said new POI in an image database for said venue; means for replacing an existing POI with said new POI in an image database for said venue; or any combination thereof.

20. An apparatus comprising:
   a wireless transceiver to:
      receive messages transmitted by mobile devices, said messages comprising digital media captured at said mobile devices while said mobile devices are located in a venue; and
   at least one processor coupled to a memory and to said wireless transceiver to:
      determine a number of matches for one or more POIs at said venue based, at least in part, on said digital media and visual attributes of one or more images associated with said one or more POIs; and
      determine a presence or an absence of said one or more POIs at said venue based, at least in part, on a statistical analysis indicating a decrease in counts of said number of matches over a period of time.

* * * * *